(No Model.)  6 Sheets—Sheet 1.
J. WALKER.
GEAR MOLDING MACHINE.
No. 248,535.  Patented Oct. 18, 1881.
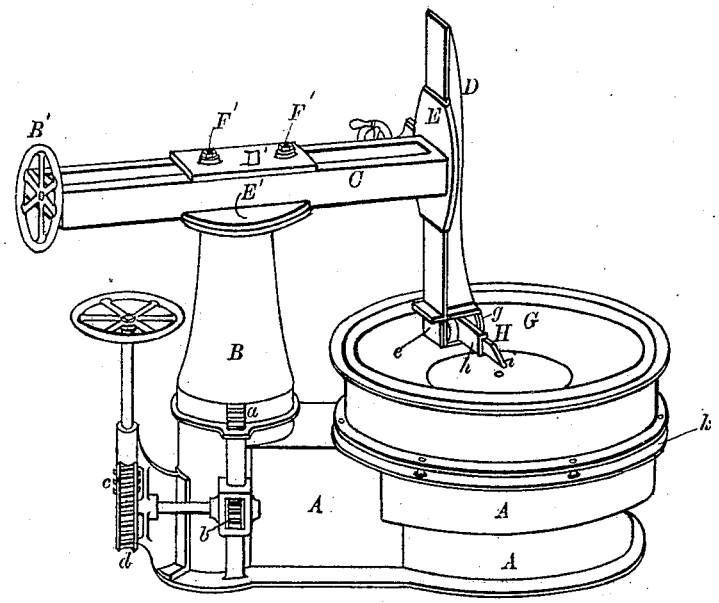
FIG. I.
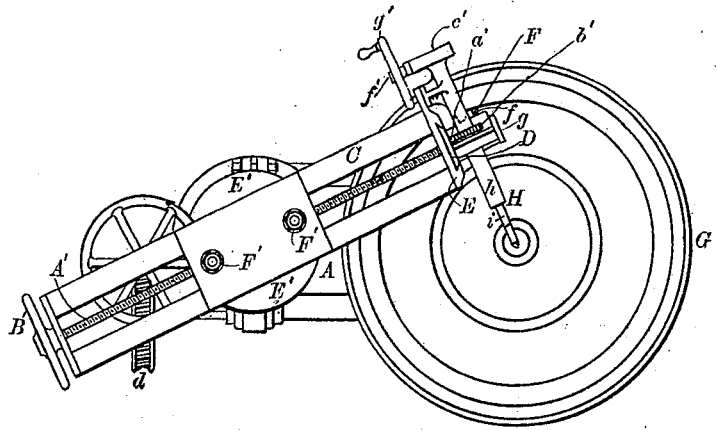
FIG. II.
WITNESSES:  INVENTOR:
Geo. A. Boyden  John Walker,
Harry V. Albaugh  by G. H. H. Howard,
  Atty.

(No Model.)  6 Sheets—Sheet 2.
J. WALKER.
GEAR MOLDING MACHINE.
No. 248,535. Patented Oct. 18, 1881.
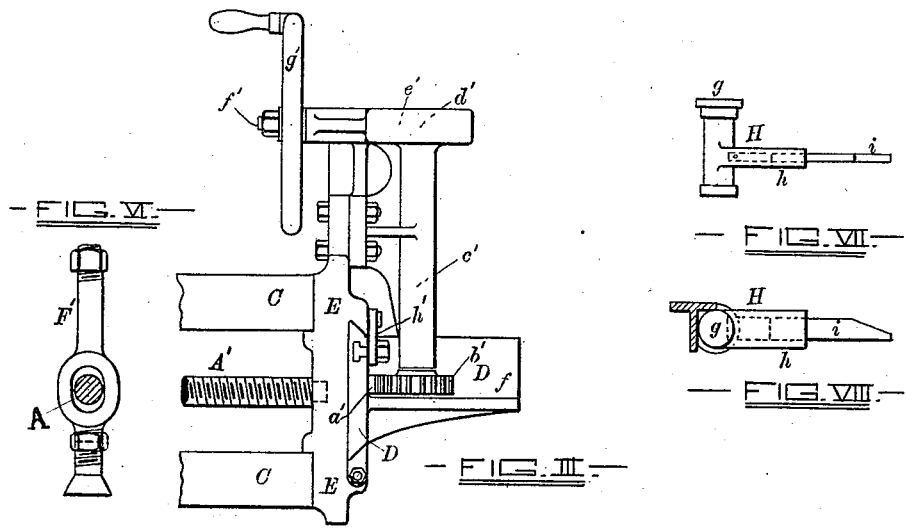
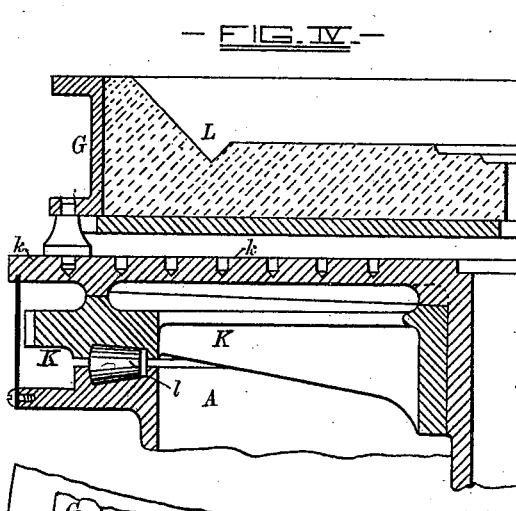
WITNESSES
Geo. A. Boyden
Harry V. Albaugh
INVENTOR
John Walker
by G. H. & W. T. Howard,
attys.

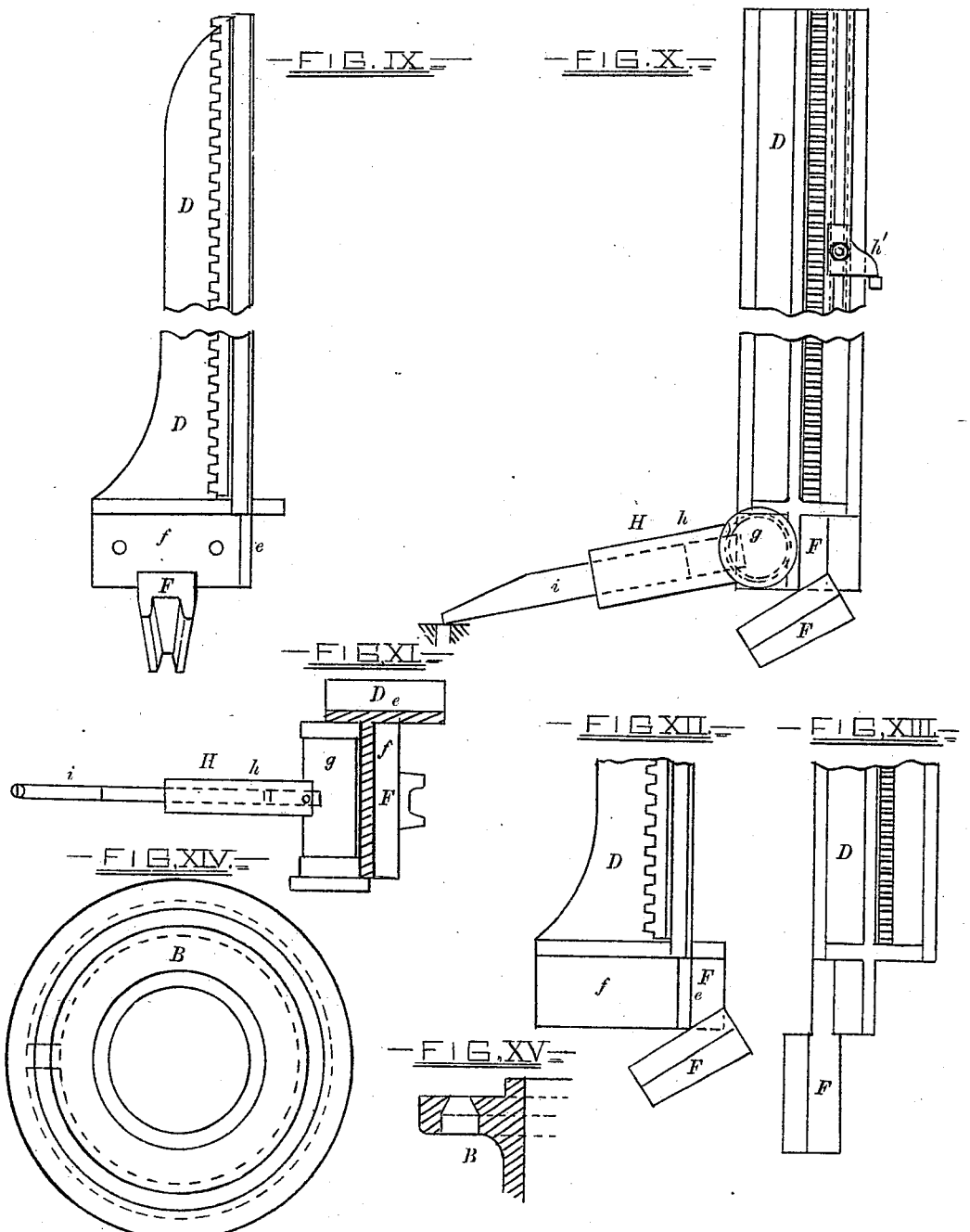

(No Model.)
J. WALKER.
GEAR MOLDING MACHINE.
No. 248,535. Patented Oct. 18, 1881.
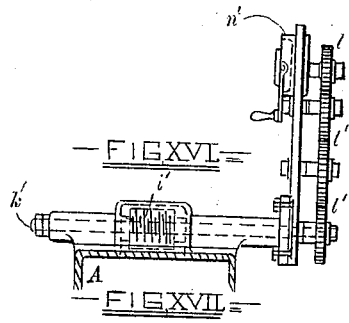
FIG. XVI.
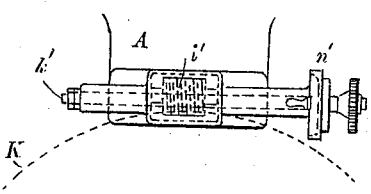
FIG. XVII.
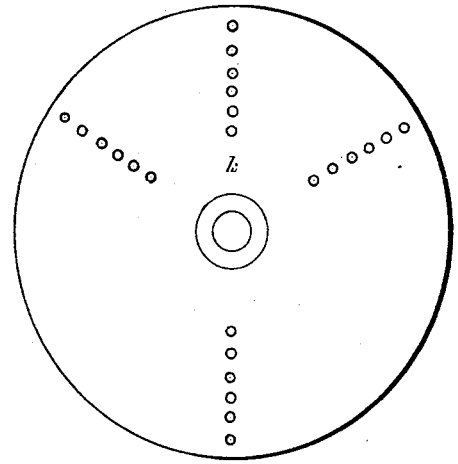
FIG. XVIII.
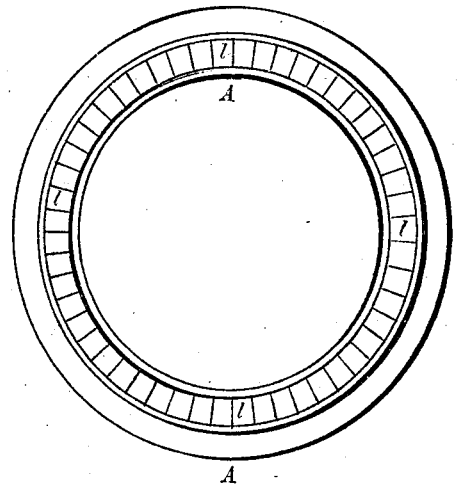
FIG. XIX.
WITNESSES:
Chas. E. Lewis
Chas. F. Weigandt Jr.
INVENTOR:
John Walker
by G. H. & W. T. Howard
Attys.

(No Model.) 6 Sheets—Sheet 5.
J. WALKER.
GEAR MOLDING MACHINE.
No. 248,535. Patented Oct. 18. 1881.
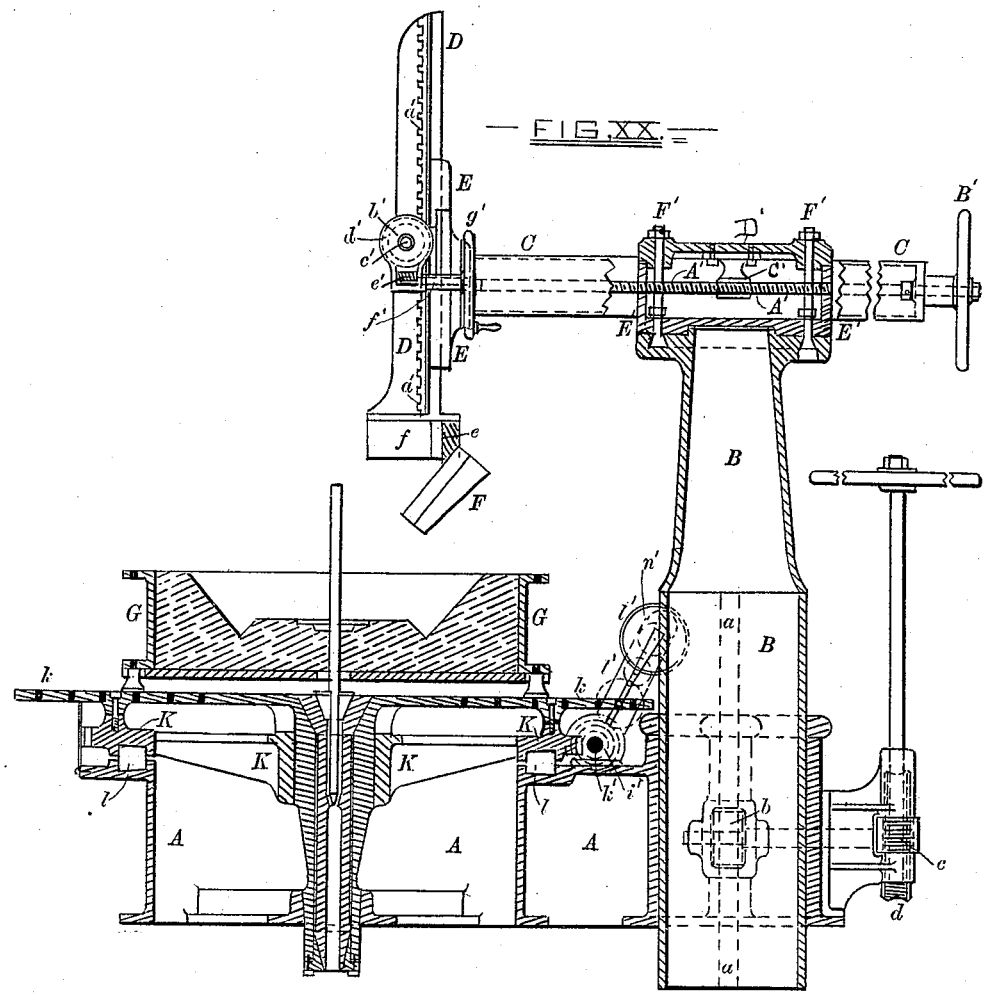

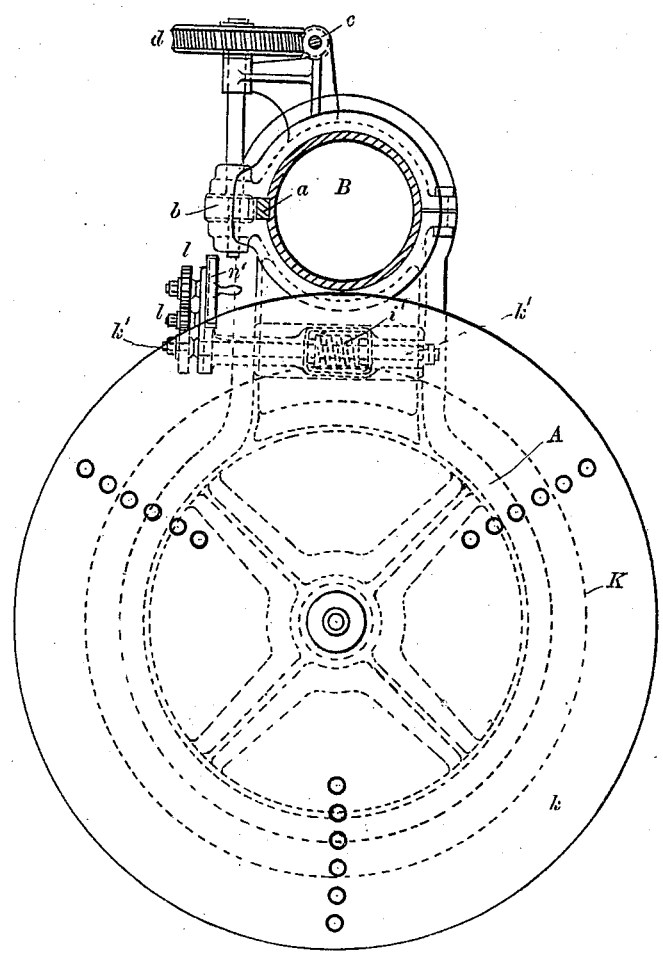

UNITED STATES PATENT OFFICE.

JOHN WALKER, OF INDIANAPOLIS, INDIANA.

GEAR-MOLDING MACHINE.

SPECIFICATION forming part of Letters Patent No. 248,535, dated October 18, 1881.

Application filed March 7, 1881. (No model.)

*To all whom it may concern:*

Be it known that I, JOHN WALKER, of Indianapolis, in the county of Marion and State of Indiana, have invented certain Improvements in Gear-Molding Machines, of which the following is a specification.

This invention relates to certain improvements in a machine in which the mold for a gear-wheel is formed without a pattern, the teeth-depressions being formed by means of a segmental adjustable tooth-block, against which the sand is packed or rammed. The bed of the mold in the flask is first prepared in a striking-machine, after which the flask is transferred to the gear-molding machine and the teeth-depressions formed, as before described. The flask and mold are moved around after each ramming operation until the entire circumference of the mold is provided with teeth-depressions, the same as if a complete pattern had been used in the molding operation.

In the further description of my said invention which follows reference is made to the accompanying drawings, forming a part hereof, and in which—

Figure I is a perspective view of the machine. Fig. II is a plan of the same. Figs. III, IV, V, VI, VII, VIII, IX, X, XI, XII, XIII, XIV, XV, XVI, XVII, XVIII, and XIX are views of parts of the invention on an enlarged scale. Fig. XX is a sectional elevation of Fig. I on an enlarged scale. Fig. XXI is a partly-sectional plan of the invention, also on an enlarged scale.

Similar letters of reference indicate similar parts in all the views.

A is the bed-piece of the machine, supporting the column B, which is adjustable in height. The vertical adjustment of the column B is effected by means of a rack, $a$, secured to one side of the column, and a pinion, $b$, which is revolved through the medium of a worm and worm-wheel, respectively represented by $c$ and $d$. Wear of the column or the portion of the bed-piece inclosing the same is provided for by vertically slotting the said portion of the bed-piece at one side thereof and connecting the separated edges by bolts, as illustrated in Figs. II and XXI of the drawings. The slotting of the bed-piece, as described, also admits of the clamping of the column B when the same is set in any desired position.

C is an arm resting on the head-piece E' of the column B, and adapted to be turned upon the same in adjusting the tooth-block and tangent-setter, as hereinafter described.

D is a bar adapted to slide vertically in a suitable guide, E, at one end of the arm C. The lower end of the bar D is adapted to receive and have securely fastened to it the tooth-block F, against which the sand is packed or rammed to form tooth-depressions in the mold. The bar D and the tooth-block are shown on an enlarged scale in Figs. III, IX, X, XI, XII, and XIII of the drawings.

The arm C is moved forward and backward on the head-piece E' of the column B by means of a screw, A', and hand-wheel B', as shown in Fig. II and on an enlarged scale in Figs. III and XX, and the bar D is vertically adjusted through the medium of a rack and pinion, as shown in Figs. III and XX of the drawings.

The mechanism for operating the bar D vertically consists of a rack, $a'$, which is secured to the face of said bar, and a pinion, $b'$, fastened to a shaft, $c'$, to the outer end of which is fitted a worm-wheel, $d'$. The worm-wheel is revolved through the agency of a worm, $e'$, shaft $f'$, and hand-wheel $g'$. A stop, $h'$, (shown in Figs. III and X,) is used to limit the downward movement of the bar D, as may be required.

The arm C is moved horizontally by means of the screw A' and wheel B', before alluded to, and by reference to Fig. XX it will be seen that the said screw engages with a nut, C', fixed to the under side of a cap, D', which is fitted to a head-piece, E', on which the arm C slides. The cap D', arm C, and head-piece E' are all clamped to the columnar frame by means of bolts F', (shown in Fig. VI,) which have eyes, through which the screw A' passes. Other devices may, however, be used in place of those shown for adjusting the lower end of the bar D to suit various-sized wheels, if desired.

The tooth-block F is fastened at the lower end of the bar D, and may occupy either one of two positions, as will hereinafter appear.

In making small gears the arm C is placed radially of the flask G, and the tooth-block secured at $e$; but in case a large gear is to be made, instead of withdrawing the vertical bar D radially to near the column B, the arm C is thrown off, as shown in Figs. I and II, and the tooth-block secured at $f$. To set the tooth-block correctly when the arm C is thus placed, I use what I term a "tangent-setter," which is placed at the end of the vertical bar D, with its point or projecting end intersecting the axial line of the flask.

The tangent-setter H consists of a hub, $g$, of such shape as to fit the lower end of the bar D, having a hollow arm, $h$, projecting from one side thereof at a right angle, and a rod, $i$, which is inserted in the hollow arm $h$ and fitted to be moved longitudinally thereof to suit the angle or inclination of the arm C and strike the axial line of the flask.

The object of the tangent-setter is to bring the center of the tooth-block in a radial line when the same is placed at $f$, and when the arm C is thrown off, as shown in Figs. I and II of the drawings.

It will be understood that the tangent-setter is necessary only when the gear to be made is too large to admit of the attachment of the tooth-block to the bar D at $e$.

When the tooth-block is set as described, and at the proper distance from the center of the flask, the sand is packed or rammed against it, and the mold at that part of its circumference completed. The face-plate, with the flask, is then revolved or moved circumferentially a distance equal to the pitch of the teeth, if a block adapted to make only one tooth-depression is employed; but if the block is fitted to form two or three tooth-depressions the distance is doubled or trebled, as will be readily understood. The rotary movement of the flask and the ramming of the sand against the tooth-block are continued until the mold of the entire periphery of the wheel is formed. The flask rests upon pins inserted in the face-plate of the machine in a manner similar to that described in Letters Patent No. 246,049, granted to me on the 23d day of August, 1881, to which reference should be had.

The face-plate of the machine is secured to a second plate, K, situated underneath the first, having a toothed circumference, and suitable gearing (shown in Figs. XVI, XVII, XX, and XXI) is employed, in connection with the toothed plate, to effect the circumferential movement of the face-plate and its mold, as may be required by the character and shape of the tooth-block. The devices which I preferably use for the purpose consist of a worm, $i'$, which engages with the teeth on the circumference of the plate K, and is revolved by means of a shaft, $k'$, to which is attached the train of change-gearing $l'$. The train is operated through the medium of a spring-handle, which, when at rest, occupies any one of a series of notches in a disk, $n'$.

The toothed plate may be formed as a part of the face-plate, if desired; but the construction shown in the drawings, Figs. IV and XX, is preferred.

To reduce the labor of turning the face-plate with its flask and sand, I rest the toothed plate on rollers, said rollers being confined in grooves, as shown in Figs. IV, XIX, and XX. In Fig. IV is also shown the bed of sand, which is represented by L, in the condition left by the striking-machine, and requiring only the sand which is packed against the face of the tooth-block to make a complete mold or section of mold.

To use this machine in connection with a striking-machine the position of the holes for the pins in the face-plate of the two machines must correspond exactly, so that in the transfer of the flask from last to the first named machine the axes of the flask and the revoluble face-plate may be the same.

I claim as my invention—

1. In a gear-molding machine, a revoluble face-plate having removable devices for centering, leveling, and supporting a flask, a vertically-adjustable frame, a swinging arm supported by the said columnar frame adapted to be moved around the same in a plane parallel with that of the face-plate, a vertically-adjustable support for a tooth-block, and mechanism for effecting the revolution of the face-plate and the vertical adjustment of the columnar frame, substantially as and for the purpose specified.

2. In a gear-molding machine, a revoluble face-plate having removable devices for centering, leveling, and supporting a flask, and a swinging arm carrying a vertically-adjustable support for a tooth-block, in combination with the removable and adjustable tangent-setter for the said tooth-block, substantially as specified.

3. In a gear-molding machine, a face-plate having centering, leveling, and supporting devices for a flask, sustained by a system of rollers, substantially as and for the purpose specified.

JOHN WALKER.

Witnesses:
WM. G. WASSON,
F. A. BLANCHARD.